United States Patent
Hurtevent et al.

(10) Patent No.: US 7,378,477 B2
(45) Date of Patent: May 27, 2008

(54) INORGANIC DEPOSIT INHIBITORS, IN PARTICULAR IN OIL WELLS, PARTICULARLY IN HIGH PRESSURE / HIGH TEMPERATURE CONDITIONS

(75) Inventors: Christian Hurtevent, Jurancon (FR); Rosangela Pirri, Montardon (FR)

(73) Assignee: Ceca S.A., Puteaux (FR)

( * ) Notice: Subject to any disclaimer, the term of this patent is extended or adjusted under 35 U.S.C. 154(b) by 406 days.

(21) Appl. No.: 10/916,540

(22) Filed: Aug. 12, 2004

(65) Prior Publication Data
US 2005/0096233 A1 May 5, 2005

Related U.S. Application Data

(63) Continuation of application No. 10/169,331, filed on Nov. 7, 2002, now abandoned.

(51) Int. Cl.
*C08F 28/02* (2006.01)
*C02F 1/00* (2006.01)

(52) U.S. Cl. .................. 526/287; 526/286; 210/698
(58) Field of Classification Search ................ 526/286, 526/287; 210/698
See application file for complete search history.

(56) References Cited

U.S. PATENT DOCUMENTS

| | | | | | |
|---|---|---|---|---|---|
| 4,536,292 | A | * | 8/1985 | Matz | 210/701 |
| 4,618,448 | A | * | 10/1986 | Cha et al. | 252/180 |
| 4,680,135 | A | * | 7/1987 | Cha et al. | 252/180 |
| 5,069,286 | A | * | 12/1991 | Roensch et al. | 166/312 |
| 5,368,830 | A | * | 11/1994 | Alfano et al. | 423/29 |
| 5,755,972 | A | * | 5/1998 | Hann et al. | 210/701 |

* cited by examiner

*Primary Examiner*—Helen L Pezzuto
(74) *Attorney, Agent, or Firm*—Millen, White, Zelano & Branigan, P.C.

(57) ABSTRACT

The present invention concerns inorganic deposit inhibitors, and particularly of calcium carbonate and barium sulphate in oil wells. It also concerns certain copolymers particularly suitable for this application, particularly in high pressure/high temperature conditions (HP/HT).

24 Claims, No Drawings

INORGANIC DEPOSIT INHIBITORS, IN PARTICULAR IN OIL WELLS, PARTICULARLY IN HIGH PRESSURE / HIGH TEMPERATURE CONDITIONS

This application is a continuation of U.S. patent application Ser. No. 10/169,331, filed Nov. 7, 2002 now abandoned.

The present invention concerns inorganic deposit inhibitors, and particularly of calcium carbonate and barium sulphate in oil wells. It also concerns certain copolymers particularly suitable for this application, particularly in high pressure/high temperature conditions (HP/HT).

The deposition of inorganic salts, generally described as scale, is a frequent problem in operations aimed at oil recovery. One of the reasons for the precipitation of such salts resides in the mixture of incompatible fluids, containing distinct ions, which are likely to combine and precipitate, forming this scale. Thus, in offshore exploitations, large quantities of sea water containing high concentrations of sulphate ions are injected into the reservoir containing barium, calcium and possibly strontium ions. The coming into contact of these two fluids leads to the precipitation of barium, calcium and strontium sulphates both in the production well and in the surface installations and other pipe work. The calcium carbonate is formed by modification of thermodynamic equilibria linked to pressure and temperature variations.

The aforesaid observations have led to the development of anti-deposition or anti-scale additives. Thus, in patents U.S. Pat. Nos. 4,710,303 and 5,092,404, the use of sodium vinylsulphonate polymers has been suggested to inhibit the precipitation of barium sulphate in water at low pH.

In patent U.S. Pat. No. 3,879,288, the use of a copolymer of a vinylic compound has been suggested, for example (meth)acrylic acid and a vinylsulphonate or alkylsulphonate to control salts and, in particular, carbonates and sulphates of calcium and other alkaline earth metals.

In patent U.S. Pat. No. 4,898,677, inhibiting the formation of barium sulphate is suggested by adding a copolymer of acrylic acid and alkali metal vinylsulphonate, with the aim of increasing the solubility or the dispersability of barium sulphate in the medium and modifying the barium sulphate crystal structure.

In patent EP-B-297049, preventing the deposition of barium sulphate is suggested by using an appropriate quantity of a water soluble polymer containing units derived particularly from vinylsulphonic acid (10 to 100%), units derived particularly from acrylic acid (0 to 90%) and units derived particularly from unsaturated compounds with amide, acid or sulphonic ester, phosphoric, alkene, and styrene groups (0 to 25%), this patent only describing vinylsulphonic acid/acrylic acid copolymers.

Patent application EP-A-792998 suggests inhibiting in particular the formation of barium sulphate by introducing, into the aqueous fluid, a water soluble polymer comprising units derived from an unsaturated sulphonic acid and its soluble salts (5 to 35%), from an unsaturated monocarboxylic acid (0 to 85%), from an unsaturated dicarboxylic acid (0 to 80%) and from a non-ionisable unsaturated monomer (0 to 20%), the aqueous fluid containing calcium, barium, strontium and sulphate ions.

According to this document, this treatment applies in particular in the so-called "squeeze" process. This process generally consists in injecting sea water into the well, then injecting the fluid containing the inhibitor into the, reservoir and injecting once again a new flow of water, with the aim of spreading out the inhibitor in the reservoir in order for it to be adsorbed on the rock.

It is interesting to note that, in the references cited above, and although calcium carbonate is cited among the salts forming scale, in fact the authors have essentially been trying to prevent the precipitation of barium sulphate under mild pressure and temperature conditions. However, it appears that certain anti-scale additives, such as terpolymers based on sulphonated monomer/acrylic acid/maleic acid, only give good results at moderate temperature (less than 150° C.). Around 200° C., sodium vinylsulphonate homopolymers have satisfactory thermal stability but insufficient adsorption on the rock.

European patent application EP-A-459 661 relates to a process for controlling the formation of deposits of silica or silicate in an aqueous system, in which is used (a) certain water soluble, low molecular weight copolymers or terpolymers of (meth)acrylic or maleic acid, (b) a magnesium ion, (c) a mixture of said copolymers or terpolymers with an aluminium or magnesium ion, or (d) poly(meth)acrylic or polymaleic acid of low molecular weight with an aluminium or magnesium ion.

U.S. Pat. No. 4,566,972 relates to a process for preventing deposits of scale in an aqueous system, by the introduction into the water of a specific amino-carboxylate and a water soluble copolymer that may-possess sulphonated units.

European patent application EP-A-184 894 relates to a process for preventing corrosion and the formation of scale and iron oxide deposits in aqueous, systems, in which are introduced, into aqueous systems, a water soluble polymer prepared from an unsaturated carboxylic acid, an unsaturated sulphonic acid and an unsaturated poly(alkylene oxide).

A first aim of the invention is inorganic deposit inhibitors that can be used in high pressure/high temperature conditions.

A further aim of the invention is inorganic deposit inhibitors that can be used in the "squeeze" process.

More particularly, an aim of the invention is inhibitors with good adsorption on the rock allowing slow desorption, as water is produced.

A yet further aim of the invention is inhibitors that are particularly efficient against the deposition of calcium carbonate and/or barium sulphate.

Other aims and advantages of the inhibitors according to the invention will become clear on reading the description that follows.

The invention thus firstly relates to inorganic deposit inhibitors, characterized in that they comprise a water soluble copolymer comprising (in mole % of polymerised monomers):

a) 5 to 95% of styrenesulphonic acid or one of its salts;
b) 5 to 95% of vinylsulphonic acid or one of its salts;
c) 0 to 20% of one or several non-ionisable unsaturated monomers.

More particularly, the invention relates to inhibitors, characterized in that they comprise a water soluble copolymer comprising (in mole % of polymerised monomers):

a) 10 to 45% of styrenesulphonic acid or one of its salts;
b) 55 to 90% of vinylsulphonic acid or one of its salts.

The invention also relates to water soluble copolymers such as those mentioned in the previous paragraphs.

As indicated previously, the aforesaid sulphonic or polycarboxylic acids may be replaced partially or totally by their salts, particularly alkali metal salts such as sodium or potassium or ammonium or quaternised amine salts.

Among the styrenesulphonic acids (and their salts), 4-styrenesulphonic acid is preferably used. When the copolymer comprises units derived from unsaturated polycarboxylic acids (or their salts), maleic acid or its anhydride, fumaric, itaconic, citraconic acids or cis 1, 2, 3, 6 tetra-hydrophthalic anhydride or water soluble sodium, potassium or ammonium salts of said acids are preferably used. Such monomers, when they are present, represent preferably up to 30% in mole % of the polymerised monomers.

Among the non-ionisable unsaturated monomers, non-substituted or (C1-C8)alkyl or hydroxy(C1-C8)alkyl substituted (meth)acrylamides; non-substituted or (C1-C8)alkyl- or hydroxy alkyl substituted (meth)acrylic esters; vinyl acetate, styrene, vinyltoluene, may, in particular, be cited. Such monomers, when they are present, represent up to 10% in mole % of the polymerised monomers.

When the copolymer only comprises units derived from derivatives of vinylsulphonic acid or its salts and styrenesulphonic acid and, in particular, 4-styrenesulphonic acid or its salts, the molar percent of vinylsulphonic acid or its salts is preferably between 70 and 90% and, even more preferably, between 80 and 90%.

The invention especially relates to such water soluble copolymers.

The water soluble copolymers according to the invention have a molar mass (by number) generally between 3 000 and 50 000 and preferably between 5 000 and 30 000. Preferably, their dispersity index $M_w/M_n$ is less than or equal to 3.

The molar mass of copolymers is measured by steric exclusion chromatography (SEC). The chromatographic chain used comprises a WATERS 590 pump (WATERS, Milford, USA), a WATERS 717plus injector and a WATERS R410 refractomeric detector. The set of columns used comprises 2 columns (POLYMER LABORATORIES PL aquagel-OH; 8 μm; 300×7.5 mm) filled with rigid, macroporous polymer beads (very hydrophilic, polyhydroxylated surface). Two porosities are used: 40 (resolution field: 10000-200000 eq. PEO/PEG) and 30 (resolution field: 100-30000 eq. PEO/PEG). The eluant is composed of 80% water (purified with MILLI-Q ZFMQ 230 04 from MILLIPORE) containing sodium nitrate at a concentration of 0.3M, sodium hydrogen phosphate at a concentration of 0.01M and 20% methanol; the solution thus has a pH of 9. The rate at which the solvent is introduced is 1 cm$^3$.min$^{-1}$. The copolymer solutions to analyse are prepared at a concentration of 1 g.l$^{-1}$ and 100 μl of solution are injected. The calibration curve is constructed from a set of 8 PULLULAN polysaccharide standards with $M_w$ between 5900 and 788000, with a narrow distribution (dispersity index between 1.06 and 1.23).

The distribution of molar masses is calculated by using the results of refractomeric detection and the calibration obtained from the PULLULAN standards. Finally, different characteristic average sizes for the distribution are calculated (Mn: average mass by number; Mw average mass by weight; I: dispersity index=Mw/Mn).

The copolymers according to the invention may be obtained by polymerising the monomers mentioned previously using conventional methods in the presence of free radical initiators.

Depending on the solubility of the monomers used, the polymerisation is carried out in aqueous solution or partially aqueous solution, for example a water/alkanol solution, or an alkanol such as ethanol, isopropanol, ethylene glycol, diethylene glycol.

The reaction medium is advantageously at acid pH, preferably less than 6.

Among the free radical initiators, one may cite peroxides, such as benzoyl or t-butyl peroxides, azo compounds, such as azo-bis-isobutyronitrile, 2,2'-azo-bis(2-amidino-propane) dihydrochloride (AIBA) and, preferably, peracid salts, such as potassium or ammonium persulphates.

The polymerisation is generally carried out at a temperature between 40 and 120° C. preferably between 45 and 100° C., and the polymerisation time may be several hours, for example 2 to 10 hours.

The copolymers are obtained in solution form and this may be subjected to partial or total evaporation, generally under reduced pressure. The copolymers that have undergone partial or total evaporation are re-diluted before their use.

The copolymers in solution may be used as such as inhibitors according to the invention, or purified in accordance with conventional methods such as:

evaporation of the reaction solvent, dissolution in water, washing with a non water miscible organic solvent (ether) and evaporation of the aqueous solution, or evaporation of the reaction solvent, dissolution of the residue in methanol and precipitation by the addition of ether.

The copolymers according to the invention, in which all or part of the acid hydrogens are replaced by cations derived from an appropriate salt forming a base may also be prepared by mixing an aqueous, water/alcohol or alcohol solution of the acid copolymer with an aqueous, water/alcohol or alcohol solution containing a quantity of the required base appropriate to the desired level of substitution.

The copolymers according to the present invention constitute inorganic deposit inhibitors, particularly of calcium carbonate and barium sulphate, and are particularly-efficient when used in the "squeeze" process in oil wells operating under high pressure conditions, in other words, around 20 to 150 MPa and high temperature, in other words around 130 to 230° C. These copolymers have in fact sufficient thermal stability, have good efficiency in inhibiting the formation of salts ($CaCO_3$ and $BaSO_4$), are insensitive to high levels of $Ca^{++}$ of the reservoir water and have sufficient adsorption on the rock for use in "squeeze" processes. This set of properties is not found in inhibitors known to the prior art, whether they are terpolymers based on sulphonated monomer/acrylic acid/maleic acid or homopolymers of sodium vinyl sulphonate.

Without being tied to a particular explanation, one could suppose that these properties are due to the presence of styrenesulphonate groups in the copolymers: these groups provide insensitivity to the calcium of copolymers of high molecular weight compared to homopolymers with the same molecular weight, and thus greater adsorption on rock.

During transportation and storage operations, the inhibitors according to the present invention are either in powder form, or in solution whose concentration may be around 15 to 30% by weight.

When used in oil wells, the solutions intended for continuous injection in the wells have a concentration of around 1 to 100 ppm, whereas the solutions used in "squeeze" processes are injected so that they are placed on the rock at a concentration of around 10% by weight, all of these concentration values being only given by way of indication.

Although the inhibitor according to the invention may be used alone, one may, without going beyond the scope of this invention, combine it with additives known in the application field, such as corrosion inhibitors, dispersing agents, precipitation agents, oxygen scavengers, sequestering agents, anti-foaming agents, biocides, de-emulsification agents, anti-asphaltenes.

The application properties of the inhibitors according to the invention are evaluated as follows:

a) Inhibition of $BaSO_4$ and $CaCO_3$

This test enables the efficiency of the deposit inhibitors used in preventive treatments to be evaluated. Performed on an anti-deposition loop, it consists in measuring the clogging time of a capillary when a mixture of two incompatible waters is injected: one water contains bicarbonates ($HCO_3^-$), the other atcium ($Ca^{++}Mg^{++}$) for a study of the carbonated deposits (calcite, etc.); one water contains sulphates ($SO_4^-$), the other barium ($Ba^{++}$, $Sr^{++}$) for a study of the sulphated deposits. Each of the waters contains a quantity of inhibitor that may generally vary between 10 and 100 ppm. Measuring the differential pressure enables the evolution of the clogging of the capillary to be monitored. The experiments comprise a control test without inhibitor and tests in the presence of inhibitors.

b) Compatibility with Calcium

One determines from what concentration in $Ca^{++}$ an inhibitor, at a given concentration, is going to precipitate. This is observed by monitoring the evolution of the cloudiness of the contact solution using a turbidimeter.

The principle of the test is to observe the appearance of cloudiness or a deposit by the decrease in the transmittance of distilled water solutions of each inhibitor (at 0.1, 1.5 and 10% by weight at pH 5, 6 and 7 when known quantities of calcium are added. The tests are carried out at ambient temperature.

c) Rock Adsorption Tests (core test)

This test is used for dimensioning the preventive treatments by the "squeeze" process. It is carried out on a representative core sample from the well in which the treatment will be carried out, and its purpose is to verify that the adsorption (or the precipitation) of the inhibitor on the porous medium is correct and thus that the treatment will have an acceptable lifetime and to verify that the adsorption (or the precipitation) of an important quantity of inhibitor will have no effect on the well productivity (reduction in the permeability). The experimental set up employs a "HASSLER" cell in which the core sample is characterised (porosity, etc.) and conditioned to the well conditions (pressure, temperature, presence of oil). The different sequences of a squeeze treatment (with the exception of overflush) are reproduced: preflush, flush, closing, formation water flush; A fraction collector at the output of the system enables samples of fractions to be collected during the injection and flushing phases in order to monitor changes in concentrations of inhibitor (adsorption/precipitation, desorption). At the end of this test, the experimental data is used to calculate an adsorption (or precipitation) law for the inhibitor, which will then be used to dimension the on-site treatment.

The examples that follow illustrate the invention.

EXAMPLES 1 to 5 AND COMPARATIVE EXAMPLES 1a to 1f

1. Copolymer Synthesis
Example for continuous addition (test 3).

The quantities of reagents and additives and the results are shown in Table I, where VS and SStNa designate respectively sodium vinylsulphonate and sodium 4-styrenesulphonate.

The sodium 4-styrenesulphonate is dissolved in water and, in a proportion of around 10% by weight of this solution, the sodium vinylsulphonate solution is added. The pH is checked and sulphuric acid (96% by weight) is added if necessary in order to obtain a pH of 3.8.

This solution of monomers is introduced into a stainless steel reaction vessel equipped with a double agitator. The vessel is degassed with nitrogen 3 times in a succession of vacuum/nitrogen cycles.

The solution is then heated under agitation (250 rpm). Simultaneously, potassium persulphate in aqueous solution is added in a single operation or continuously at a flow rate of 25 cm$^3$/h (see table) and the remainder of the solution of SStNa added continuously at the same speed.

The temperature is maintained for 1 to 2 hours, or the polymerisation is carried out at two different temperatures (see Table I).

It is then allowed to cool to 400° C. and the solution removed.

A polymer solution at a concentration of 20% by weight is obtained.

Example for Batch (Tests 1, 2, 4, 5, 1a and 2a)

The SStNa is dispersed and/or dissolved in the VS solution. The pH is adjusted to 3.8. It is then heated to the reaction temperature. The initiator is added and the solution left for 2 to 10 hours.

2. —Application Properties

The inhibitors are used in the form of aqueous solutions at different concentrations according to the test and are subjected to the tests described above.

The results are shown in Table II.

In the "Additive" column, the symbols have the following meaning:
  VS=sodium vinylsulphonate (monomer)
  HVS=sodium vinylsulphonate homopolymer
  VS/VSS=sodium vinylsulphonate/sodium styrenesulphonate copolymer, with the molar proportions of the monomers polymerised given.
  TROS810=HVS commercialised by the TROS Company
  EC6151A=HVS commercialised by the Nalco/Exxon Company.

In the "thermal stability" column, the symbol OK signifies a stability verified after 3 weeks at 200° C.

In the "calcium compatibility" column, the term "compatible" signifies the absence of cloudiness or deposit, for a quantity of calcium up to 40 g/l and a pH of the medium from 4 to 7.

In the "adsorption" column, the quantity of inhibitor adsorbed per gram of rock is shown (in mg): the rock used had the following characteristics:
  209 g core sample with a pore volume of 16.5 cm$^3$.
  Sandstone An aqueous solution with 10% inhibitor was injected while maintaining the rock at a temperature of 200° C. (use in "squeeze").

In the "desorption" column, the lifetime of the treatment is indicated (in days) at the end of which the concentration in inhibitor in the production water was respectively 1, 5, 10 or 50 ppm. The values were obtained by simulation using a "Squeeze 5" software, developed by Heriott Watt University in Edinburgh. This simulation was carried out using the following operating conditions:
  deposit thickness: 30 m
  injection of 220 m$^3$ of solution with 10% inhibitor
  production of water: 500 m$^3$/day and by integrating the adsorption values from Table II.

TABLE I

| | Polymerisation conditions | | | | | | | Copolymer obtained | | |
|---|---|---|---|---|---|---|---|---|---|---|
| | Monomers (g) | | | | | Temperature | | Molar mass | Composition (moles) | |
| Example | VS (at 25%) | SStNa | $H_2SO_4$ (g) | Water (g) | Operating conditions | (° C.) and duration | Initiator (g) | Mn/Mw | VS | VSS |
| 1 | 187.3 | 8.25 | 0 | 20 | batch | 50/6 h | $K_2S_2O_8$ 2.16 | 10670 18190 | 90 | 10 |
| 2 | 176.9 | 12.4 | 0 | 50 | batch | 50/6 h | $K_2S_2O_8$ 2.16 | 7745 22030 | 85 | 15 |
| 3 | 442.3 | 3.09 27.81 | 0.9 | 250 | Continuous addition of initiator over 2 h + remainder of SstNa solution | 80/2 h + 90/1 h | $K_2S_2O_8$ 5.4 | 5530 12350 | 85 | 15 |
| 1a | 416.3 | 0 | 0 | 100 | batch | 50/4 h | $K_2S_2O_8$ 4.32 | 7607 9141 | 100 | — |
| 2a | 416.3 | 0 | 0 | 200 | batch | 50/4 h | $K_2S_2O_8$ 1.1 | 8292 10440 | 100 | — |
| 4 | 468.4 | 22.9 | 1.8 | 150 | batch | 50/6 h | $K_2S_2O_8$ 5.4 MBS 3.8 | 12500 17670 | 90 | 10 |
| 5 | 468.4 | 22.9 | 1.2 | 25 | batch | 70/6 h | AIBA 5.4 | 8321 21940 | 90 | 10 |

MBS: sodium metabisulphite ($Na_2S_2O_8$)

TABLE II

| Example | Additive tested | Molar mass Mn/Mw | Thermal stability | Efficiency test on deposits Clogging time in hours | | Calcium compatibility | Adsorption on the rock (mg/g) | Desorption in days (simulation) | | | |
|---|---|---|---|---|---|---|---|---|---|---|---|
| | | | | $BaSO_4$ 50 ppm | $CaCO_3$ 10 ppm | | | 1 ppm | 5 ppm | 10 ppm | 50 ppm |
| 1e | None | — | — | 0.8 | 1.3 | | | | | | |
| 1f | VS monomer | — | NO | 0.4 | 2.1 | Compatible | | | | | |
| 1 | VS/VSS 90-10 | 10670 18190 | OK | 6.5 | 3.1 | Compatible | 1.75 | 390 | 286 | 209 | 37 |
| 2 | VS/VSS 85-15 | 7745 22030 | OK | 7.0 | 5.3 | Compatible | | | | | |
| 3 | VS/VSS 85-15 | 5530 12350 | OK | 6.5 | 5.0 | Compatible | | | | | |
| 1a | VS 100 | 7607 9141 | OK | 6.8 | 3.3 | Compatible | | | | | |
| 1b | VS 100 | 8292 10440 | | 6.8 | 6.2 | Compatible | | | | | |
| 1c | TROS 810 | 13270 17820 | OK | 6.9 | 3.9 | Very cloudy if concentration > 1% | | | | | |
| 1d | EC 6151A | 10480 13360 | OK | 7.0 | 5.8 | Cloudy if pH > 7 | 1 | 297 | 127 | 58 | 20 |
| 4 | VS/SS 90/10 | 12500 17670 | OK | 6.9 | — | Compatible | | | | | |
| 5 | VS/SS 90/10 | 8321 21940 | OK | — | — | Compatible | | | | | |

The invention claimed is:

1. In a method of inhibiting inorganic deposition, the improvement comprising the use of a water soluble copolymer consisting of in mole % of polymerized monomers:
   a) 10 to 45% of styrenesulphonic acid or one or more of its salts; and
   b) 55 to 90% of vinylsulphonic acid or one or more of its salts.

2. A method according to claim 1, wherein all or part of the sulphonic acids are replaced by their quaternised amine salts.

3. A method according to claim 1, wherein all or part of the sulphonic acids are replaced by their alkaline metal salts.

4. A method according to claim 1, wherein all or part of the sulphonic acids are replaced by their ammonium salts.

5. A method according to claim 1, wherein the styrenesulphonic acid is 4-styrenesulphonic acid.

6. A method according to claim 1, wherein the copolymer has a molar mass between 3,000 and 50,000.

7. A method according to claim 1, wherein the copolymer has a dispersity index $M_w/M_n$ less than or equal to 3.

8. A method according to claim 1, wherein the mole % of vinylsulphonic acid is 70 to 90%.

9. A method according to claim 1, wherein the pressure is 20 to 150 MPa and the temperature is 130 to 230° C. in a system where inorganic deposition is inhibited.

10. A method according to claim 1, wherein the molar mass of the copolymer is between 5,000 and 30,000.

11. A method according to claim 1, wherein the molar mass of the copolymer is between 5,000 and 30,000.

12. A method according to claim 1, wherein the deposition of calcium carbonate and/or of barium sulphate is inhibited.

13. A method of inhibiting inorganic deposition in an oil well, comprising injecting into said oil well a fluid that comprises a water soluble copolymer consisting of in mole % of polymerized monomers:
   a) 10 to 45% of styrenesulphonic acid or one or more of its salts; and
   b) 55 to 90% of vinylsulphonic acid or one or more of its salts.

14. A method according to claim 13, wherein all or part of the sulphonic acids are replaced by their alkaline metal salts or their ammonium salts or their quaternised amine salts.

15. A method according to claim 13, wherein the styrenesulphonic acid is 4-styrensuiphonic acid.

16. A method according to claim 13, wherein the copolymer has a molar mass between 3,000 and 50,000.

17. A method according to claim 13, wherein the copolymer has a dispersity index $M_w/M_n$ less than or equal to 3.

18. A method according to claim 13, wherein the mole % of vinylsulphonic acid is 80 to 90%.

19. A method according to claim 13, wherein the pressure is 20 to 150 MPa and the temperature is 130 to 230° C. in the well.

20. A method according to claim 13, wherein the deposition of calcium carbonate and/or of barium sulphate is inhibited.

21. A method according to claim 14, wherein the deposition of calcium carbonate and/or of barium sulphate is inhibited.

22. A method according to claim 13, wherein all or part of the sulphonic acids are replaced by their alkaline metal salts.

23. A method according to claim 13, wherein all or part of the sulphonic acids are replaced by their ammonium salts.

24. A method according to claim 13, wherein all or part of the sulphonic acids are replaced by their quaternised amine salts.

* * * * *

UNITED STATES PATENT AND TRADEMARK OFFICE
CERTIFICATE OF CORRECTION

PATENT NO.        : 7,378,477 B2
APPLICATION NO.   : 10/916540
DATED             : May 27, 2008
INVENTOR(S)       : Christian Hurtevent Page 1 of 1

It is certified that error appears in the above-identified patent and that said Letters Patent is hereby corrected as shown below:

Column 7, line 60 reads "styrenesuiphonic" should read --styrenesulphonic--
Column 9, line 22 reads "styrenesuiphonic" should read --styrenesulphonic--

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

PATENT NO.         : 7,378,477 B2                                    Page 1 of 1
APPLICATION NO.    : 10/916540
DATED              : May 27, 2008
INVENTOR(S)        : Christian Hurtevent It is certified that error appears in the above-identified patent and that said Letters Patent is hereby corrected as shown below:

On the Title Page, section [30] insert --[30] Foreign Application Priority Data:
　　　　　　　　　　　　　　December 29, 1999 (FR)........ 9916654--

On the Title Page, section [86], insert: --[86] PCT No.: PCT/FR/00/03712
　　　　　　　　　　　　　　§ 371 (c)(1), (2), (4) Date: Dec. 28, 2000--

Signed and Sealed this

Fourth Day of May, 2010

David J. Kappos
*Director of the United States Patent and Trademark Office*